O. M. LEICH.
CONVERTER.
APPLICATION FILED AUG. 4, 1919.
1,388,274.
Patented Aug. 23, 1921.
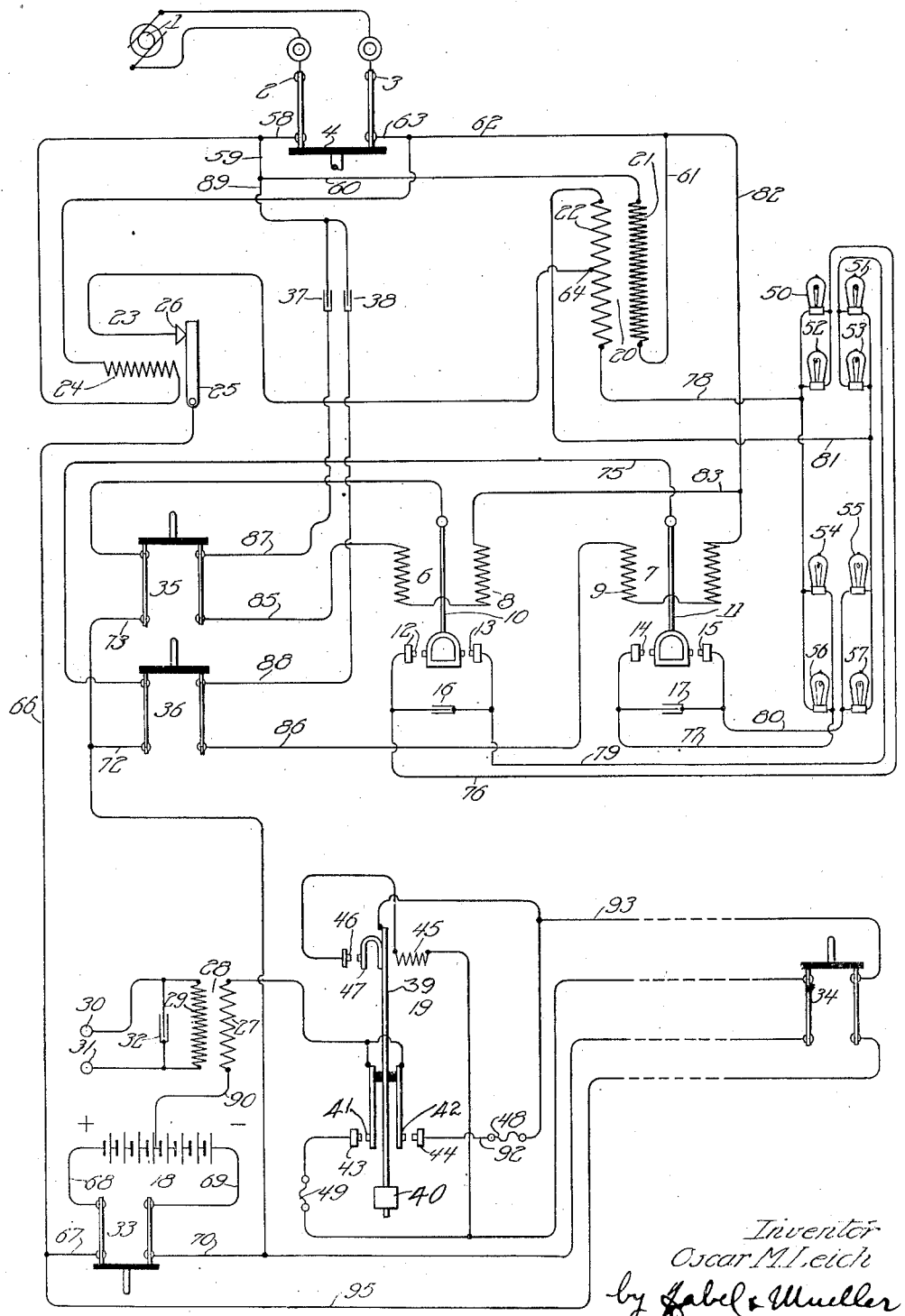
Inventor
Oscar M. Leich
by Habel & Mueller
Attys.

UNITED STATES PATENT OFFICE.

OSCAR M. LEICH, OF GENOA, ILLINOIS, ASSIGNOR TO LEICH ELECTRIC COMPANY, OF GENOA, ILLINOIS.

CONVERTER.

1,388,274.     Specification of Letters Patent.     Patented Aug. 23, 1921.

Application filed August 4, 1919. Serial No. 315,146.

*To all whom it may concern:*

Be it known that I, OSCAR M. LEICH, a citizen of the United States, residing at Genoa, in the county of De Kalb and State of Illinois, have invented a certain new and useful Improvement in Converters, of which the following is a full, clear, concise, and exact description, reference being had to the accompanying drawings, forming a part of this specification.

My invention relates to converters and more particularly to converters which are designed to transform alternating current into uni-directional current.

My invention in one of its many applications is of particular utility, for instance, in connection with the furnishing of direct or uni-directional current for battery charging purposes or for the furnishing of uni-directional current which may be suitably controlled and reconverted into alternating current or pulsating current of a frequency different than the frequency of the original alternating current.

Going further into detail as to the particular application of one or more of the features of my invention, it may be applied to a system in which a pair of vibratory converters are designed to furnish current which can be suitably modified by a vibrator to emit alternating or pulsating current of a different frequency. The arrangement is such that the capacity of the ultimate supply circuit which is to receive the current in its final modified form is greater than the current capacity of any one vibratory rectifier. I thus utilize two or more rectifiers and provide suitable means so that neither rectifier is called upon to furnish more current than its allotted capacity.

In the particular form of the system now under discussion I find it desirable to introduce a floating or equalizer battery between the rectifiers and the current modifier which gives to the current its final characteristic form.

It will be understood also that my improved system contemplates the use of two or more rectifying units for use in connection with battery charging when the charging current of the battery is in excess of the safe loading capacity of a single rectifier unit.

My invention is more particularly an improvement over systems disclosed in the following patents issued to me: No. 1,271,733, issued July 9, 1918; No. 1,288,935, issued December 24, 1918, and No. 1,291,942, issued January 21st, 1919.

I will explain my invention as applied more particularly to a system such as above outlined in connection with the accompanying drawing which illustrates diagrammatically one specific form of application of my invention.

In the drawing I show a source of alternating current 1 which may be of the customary sixty cycle type and from which the current is taken. The conductors from this source terminate in the posts 2 and 3 of the main line switch 4, suitable fuses 5 being interposed. I also show two rectifiers 6 and 7, respectively, having the actuating coils 8 and 9, which control the synchronous vibration of the vibratory elements 10 and 11 respectively in accordance with the alternations of the alternating current supplied by the alternating source 1. The vibratory elements 10 and 11 carry contacts which are electrically connected together, which contacts are adapted to coöperate with coöperating contacts, respectively, the contacts 12 and 13 and the contacts 14 and 15. Suitable condensers 16 and 17 are bridged across these contacts to dispel any arcing tendency, these condensers 16 and 17 being of a low enough capacity, however, so as not to cause a low impedance path across the said contacts so that there is no current loss of any appreciable quantity through these condensers. These rectifiers 6 and 7 are adapted to operate in parallel so as to double the amount of uni-directional current that each one alone could supply, which uni-directional current can be used for various purposes, it being shown herein as serving to charge the battery 18 and in addition to furnish current to operate the electro-magnetic vibrator 19.

My invention further contemplates the use of a transformer 20 having the primary winding 21 and the secondary winding 22, the secondary winding furnishing the current which is rectified by the rectifiers 6 and 7.

My invention also contemplates the use of a relay 23 having the winding 24, movable contact or armature 25, and the front contact 26, which relay is designed to prevent the battery 18 from sending current over the devices should the main source of alternating current be interrupted for any reason whatsoever.

My invention contemplates that the current from the alternating current source is rectified by the rectifiers 6 and 7. The rectified current is then used to charge the storage battery 18 and to operate it as a floating battery, at the same time furnishing current for the vibratory converter 19, which vibratory converter changes the frequency of the uni-directional current and supplies it to the primary winding 27 of a transformer 28, the secondary winding 29 of which is directly connected to terminals 30 and 31 of a consumption circuit, which, in this instance, is the ringing circuit of a telephone exchange. A condenser 32 is bridged across the terminals at 31 for purposes well understood.

I also provide a switch 33, which when opened disconnects the battery 18 and the vibrator 19 from the rectifiers 6 and 7. I also provide a switch 34 which in general is designed to be placed at some point remote from the device, which switch when opened disconnects the vibrator 19 from its source of current supply, thereby to stop the operations of the vibratory element 19 without, however, interfering with the charging of the battery 18 on the part of the rectifiers 6 and 7, should the main switch 4 remain closed and should switches 35 and 36 also remain closed. Switch 35 controls the circuit to the winding 8 of the rectifier 6 and also controls the circuit through the vibratory element of the same rectifier. Similarly, switch 36 controls the rectifier 7. Condensers 37 and 38 are interposed in the circuits of the coils 8 and 9 respectively for purposes of phase control, whereby to synchronize the actuations of the elements 10 and 11 in harmony with the alternations of the alternating current source 1. The vibratory converter 19 has the vibrator spring 39, the vibrations of which are influenced by the position of the weight 40, and which vibratory element carries contacts 41 and 42 insulated therefrom, however, but electrically connected together. These contacts 41 and 42 coöperate with the stationary contacts, respectively, 43 and 44. In order to cause the proper vibration of the vibratory element 39 an electromagnet 45 is provided whose circuit is controlled by the stationary contact 46 and the contact 47 carried by the vibratory element 39. Suitable fuses 48 and 49 are included in circuit for purposes that will be readily apparent.

It will be noted that both rectifiers 6 and 7 when the circuits are in the condition shown, operate in parallel. Difficulty is experienced in the operation of rectifiers in parallel, being due to the non-synchronous operation or faulty operation of the vibratory elements thereof by virtue of which one rectifier is given a greater load than that for which it is designed. Now in order to prevent this, I provide each rectifier with means herein shown as lamp resistances to prevent each rectifier from being burdened with an overload. The lamp resistances which are used in connection with the rectifier 6 consist of the lamps 50, 51 and 52, 53. Similarly there are provided for the rectifier 7 the lamp resistances 54, 55 and 56, 57. The lamp resistances 50, 51, 54, and 55 are of about twelve and one-half ohms resistance. The resistances 52, 53 and 56, 57, are of somewhere near five or ten ohms resistance when cold. These latter, in the operation of the device and when all parts are working normally, do not burn brightly, but merely glow. If on the contrary they should burn brightly, it is an indication that something is wrong with the rectifiers, very likely a short circuit of the contacts. It will be noted that the lamp resistances 50 and 52 are connected in parallel and are then directly in series with the contact 12. Similarly, the resistances 51 and 53 are associated with the contact 13, resistances 54 and 56 associated with contact 14 and resistances 55 and 57 associated with the contact 11. These resistances prevent the passage of a current flow in excess of that for which the rectifier contacts are designed. This will explain the functions of the various parts of the apparatus and their general purpose in connection with the system. In order to more clearly set out their association in the circuits, these circuits will now be more clearly explained.

The circuit for the primary winding 21 extends from the contact 2 by way of conductor 58, conductor 59, conductor 60, primary winding 21, conductor 61, conductor 62, conductor 63, to the other terminal 3 of the alternating current source. The primary winding 21 is thus bridged across the alternating current source.

The circuit of the rectified current extends from the contact point 64 by way of conductor 65, contacts 26, 25, conductor 66, conductor 67, switch 33, conductor 68, to the positive terminal of the battery 18 and from the negative terminal of said battery by way of conductor 69, switch arm of the switch 33, conductor 70, conductor 71, and then by way of conductors 72 or 73 through their respective switch arms of the switches 36 and 35, and then by way of conductors 74 and 75 in parallel to the vibratory elements 10 and 11 of the rectifiers 6 and 7. These arms 10 and 11 are vibrated in synchronism with the alternating current so that both are constantly of a negative polarity so they engage their corresponding contacts 12, 13 or 14, 15, when those contacts are of negative polarity. The circuit then further extends from these vibratory elements 10 and 11 through the coöperating contact 12 or 13, for instance, of the rectifier 6, conductor 76, and at the same time through the coöperating contact 14, conductor 77, (the contacts 76 and 77 being now in parallel) through their corresponding resistances, that is, the resistances 50, 52, or the resistances 54, 56, by way of conductor 78, to one of the terminals of the secondary winding 22. Similarly, conductors 79 and 80 come into use when the vibratory elements 10 and 11 are associated with the contacts 13 and 15, whereupon the circuit from the vibratory elements 10 and 11 is extended through these conductors 79 and 80 in parallel through their respective resistances 51, 53 and 55, 57, thence by way of conductor 81 to the opposite terminal of the secondary winding 22. The vibratory elements 10 and 11 are in coöperation with the contacts 13 and 15 when the upper terminal of the secondary winding 22 has a negative potential and are in contact with the contact posts 12 and 14 when the lower terminal of the secondary winding has a negative potential. It will be noted that the relay 24 controls the contacts 25 and 26 which are serially included in this rectified circuit just described.

Should the current from the source 1 be interrupted for any reason whatsoever then the relay 24 will permit opening of the circuit between the contact points 25 and 26 so there is no danger that the battery 18 sends current over this circuit should the vibratory arms 10 and 11 be in association with any of their coöperating contacts. It will be noted that the winding 24 of the relay 23 is directly bridged across the source of alternating current 1. The circuit through the actuating coils 8 and 9 of the rectifiers 6 and 7 can be traced from the terminal 3 of the alternating current source by way of conductors 63, 62, 82, thence by way of conductors 83 and 84 in parallel through the windings 8 and 9 in parallel, thence by way of conductors 85 and 86 through their respective switches 35 and 36, thence by way of conductors 87 and 88 in parallel, through their respective condensers 37 and 38, and by way of conductors 89, 58 and 59 to the other terminal of the alternating current source.

It will be noted that either rectifier may be operated alone, if desired, by opening the respective switch 35 or 36 of the other rectifier. It will be seen that switch 35, for instance, controls not only the circuit through the actuating coil 8 of the rectifier, but also the rectified current circuit through the vibratory element 10 of the same rectifier.

It will be noted that the vibratory converter 19 in the specific form shown herein acts as a pole changer and the circuit through its contacts may be traced from the central point of the battery 18 by way of conductor 90, primary winding 27, conductor 91, contact springs 41 and 42, and thence in two paths leading respectively to the negative terminal of the battery 18 and the positive terminal of the battery 18. It will be sufficient to trace one of these circuits and this can be traced from the spring 42 by way of stationary contact 44, conductor 92, fuse 48, conductor 93, switch 34, conductor 95, conductor 67, switch 33, conductor 68, to the positive terminal of the battery 18. The springs 41 and 42 are connected together and they are alternately of positive or negative polarity, thus providing an alternating current through the primary winding 27. Thus an alternating current is induced in the secondary 29 which may be taken off from the binding posts 30 and 31. In general, the frequency of the current provided by the vibrator 19 will be considerably lower than the frequency of the impressed alternating current whenever the device is applied for use in connection with ringing circuits of telephone exchanges. It will of course be readily apparent that in this connection the battery 18 acts as a floating battery although it will be seen that if switches 35 and 36 are open and switches 34 and 33 closed, that the vibratory converter 19 may operate directly from the battery 18. It will also be remembered that the battery 18 may be charged without at the same time operating the vibratory converter 19 if switch 34 is opened.

From what has been described the nature of my invention will be readily apparent to those skilled in the art, as will also its many and various modifications. Having however thus described one form which my invention may take, what I claim as new and desire to secure by Letters Patent is:

1. Apparatus of the character described comprising a source of alternating current, two or more vibratory rectifiers, means associated with each rectifier for limiting the current flow therethrough to protect the contacts thereof against overload, said rectifiers being adapted to convert said alternating current into uni-directional current, a translating device receiving said uni-directional current, means for connecting said rectifiers to supply said uni-directional current in parallel relationship to said translating device, an equalizer battery associated with said translating device and rectifiers to equalize the current supply to said translating device, a switch for controlling the association of said uni-directional current with said translating device and said battery, a second switch for controlling the association of said uni-directional current with said translating device, and a transformer having a primary and secondary winding, the primary winding being connected to said translating device and an intermediate point of said battery.

2. Apparatus of the character described comprising a source of alternating current, two or more vibratory rectifiers, means connected with each rectifier for limiting the current flow therethrough to protect the contacts thereof against overload, said rectifiers being adapted to convert said alternating current into uni-directional current, a vibratory converter receiving said uni-directional current, means for connecting said rectifiers to supply said uni-directional current in parallel relationship to said vibratory converter, an equalizer battery associated with said vibratory converter and rectifiers to equalize the current supply to said vibratory converter, a switch for controlling the association of said uni-directional current with said vibratory converter, a second switch for controlling the association of said uni-directional current with said vibratory converter, and a transformer having a primary and secondary winding, the primary winding being connected to said translating device and an intermediate point of said battery.

In witness whereof, I hereunto subscribe my name this 29th day of July, A. D. 1919.

OSCAR M. LEICH.